United States Patent [19]

Kodama et al.

[11] Patent Number: 6,023,758
[45] Date of Patent: Feb. 8, 2000

[54] METHOD AND PROCESSOR FOR CHANGING PROGRAM BY REPLACING INSTRUCTION STORED IN ROM WITH PREDETERMINED VALUE TO BE INTERPRETED AS AN INSTRUCTION

[75] Inventors: Hisashi Kodama, Hirakata; Toshiyuki Araki, Takatsuki, both of Japan

[73] Assignee: Matsushita Electric Industrial Co., Ltd., Kadoma, Japan

[21] Appl. No.: 08/651,755

[22] Filed: May 22, 1996

[30] Foreign Application Priority Data

May 25, 1995 [JP] Japan ..................... 7-126157

[51] Int. Cl.[7] ............... G06F 9/00; G06F 9/06; G06F 11/00
[52] U.S. Cl. ............ 712/220; 712/226; 712/234; 712/32; 712/37; 714/6; 714/7
[58] Field of Search ............ 395/800, 182, 395/183, 421, 500, 581, 182.04, 182.05, 429, 430, 431, 800.35–800.38; 371/21, 100.2; 711/100–103; 712/32, 36–38, 220, 225–226, 233–234; 714/6–7

[56] References Cited

U.S. PATENT DOCUMENTS

| | | | |
|---|---|---|---|
| 4,607,332 | 8/1986 | Goldberg | 714/8 |
| 4,726,024 | 2/1988 | Guziak | 714/24 |
| 4,905,200 | 2/1990 | Pidsosny et al. | 711/103 |
| 4,985,893 | 1/1991 | Gierke | 714/29 |
| 5,327,531 | 7/1994 | Bealkowski et al. | 714/6 |
| 5,333,278 | 7/1994 | Miyazawa | 710/104 |
| 5,357,627 | 10/1994 | Miyazawa et al. | 714/6 |
| 5,408,672 | 4/1995 | Miyazawa et al. | 712/37 |
| 5,434,814 | 7/1995 | Cho et al. | 365/185.13 |
| 5,515,519 | 5/1996 | Yoshioka et al. | 712/234 |
| 5,574,926 | 11/1996 | Miyazawa et al. | 712/38 |
| 5,592,613 | 1/1997 | Miyazawa et al. | 714/6 |

FOREIGN PATENT DOCUMENTS

| | | |
|---|---|---|
| 62239234 | 10/1987 | Japan . |
| 333926 | 2/1991 | Japan . |
| 3273425 | 12/1991 | Japan . |
| 4125730 | 4/1992 | Japan . |
| 6139064 | 5/1994 | Japan . |

OTHER PUBLICATIONS

Hamachen et al., "Computer Organization", 1984, McGraw–Hill, Inc., pp. 303–304.

*Primary Examiner*—Zarni Maung
*Assistant Examiner*—Bharat Barot
*Attorney, Agent, or Firm*—Renner, Otto, Boisselle, Sklar

[57] ABSTRACT

According to the present invention, a method for changing a program including a plurality of instructions in a processor having a ROM for storing the program therein is provided. The method includes the steps of: replacing one of the plurality of instructions which are stored in the ROM with data having a predetermined value; and interpreting the data having the predetermined value as an instruction.

15 Claims, 9 Drawing Sheets

FIG.2

| Assembly language | Machine language |
|---|---|
| load  dreg,dm(p+) | 8191 |
| store  dm(p), breg | 9921 |
| nooperation | F000 |
| branch  8FA | 08FA |
| branch  000 | 0000 |
| add  dreg, dreg, breg | A112 |

FIG.3

Program ROM region

| Address | Output, assembly language |
|---|---|
| 800 | 8191 =load  dreg,dm(p+) |
| 801 | 9921 =store  dm(p),breg |
| ⋮ | ⋮ |
| 9A0 | F000 =nooperation |
| 9A1 | A112 =add  dreg,dreg,breg |
| 9A2 | 08FA =branch  8FA |
| ⋮ | ⋮ |
| FFF | 0800 =branch  800 |

Bug ⟶ 9A1

FIG. 4

Program ROM region

| Address | Output, assembly language |
|---|---|
| 800 | 8191 = load dreg,dm(p+) |
| 801 | 9921 = store dm(p),breg |
| ⋮ | ⋮ |
| 9A0 | F000 = nooperation |
| 9A1 | 0000 = branch 000 |
| 9A2 | 08FA = branch 8FA |
| ⋮ | ⋮ |
| FFF | 0800 = branch 800 |

After correction → 9A1

RAM region

| Address | Output, assembly language |
|---|---|
| 000 | 8191 = load dreg,dm(p+) |
| 001 | 9921 = store dm(p),breg |
| ⋮ | ⋮ |
| 02C | 09A2 = branch 9A2 |

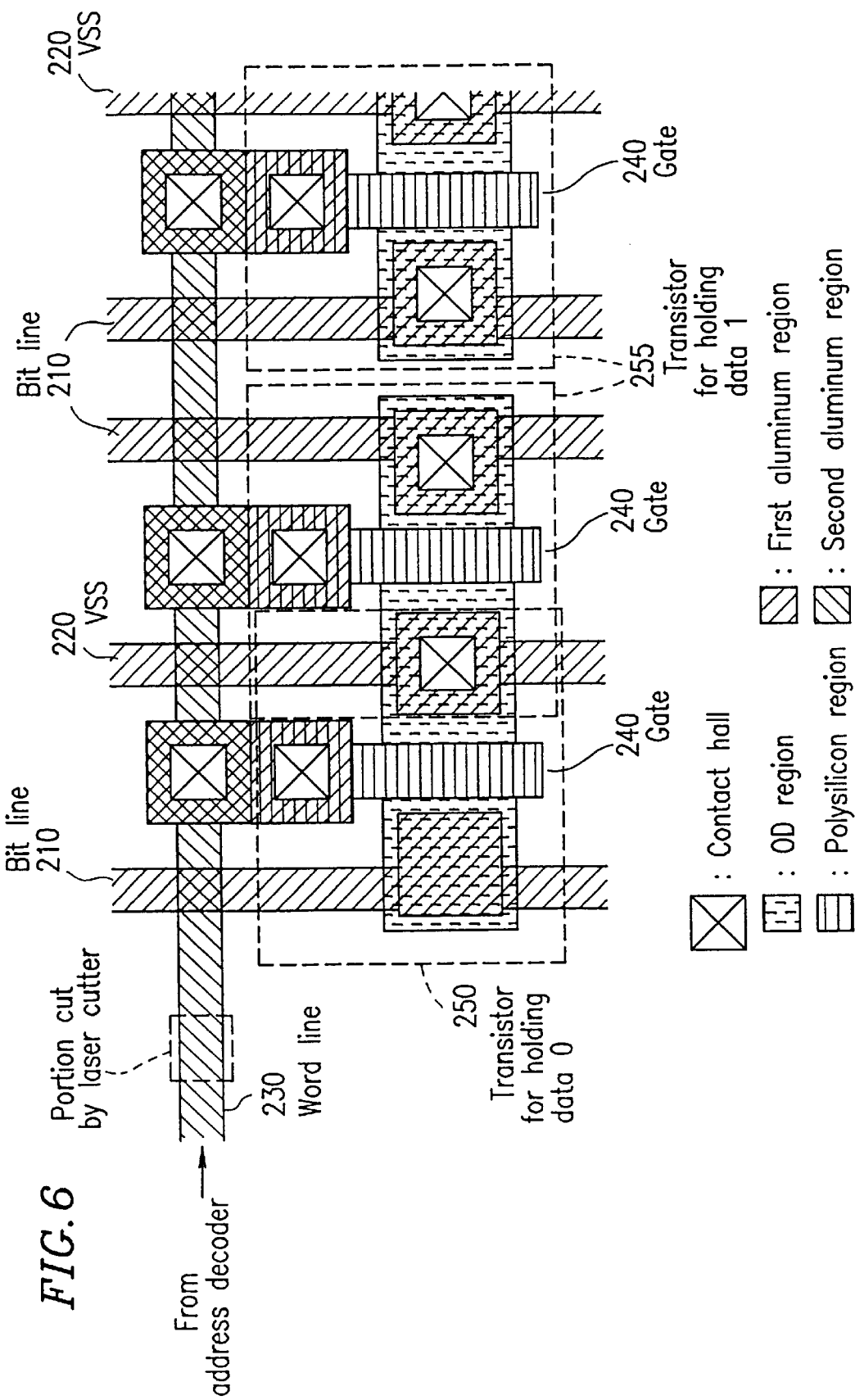

FIG. 7

| Assembly language | Machine language |
|---|---|
| load   dreg,dm(p+) | 8191 |
| store  dm(p), breg | 9921 |
| nooperation | 1000 |
| branch  8FA | F705 |
| branch  FFF | FFFF |
| add    dreg,dreg,breg | A112 |

FIG. 8

| Assembly language | Machine language |
|---|---|
| load   dreg,dm(p+) | 8191 |
| store  dm(p), breg | 9921 |
| nooperation | 1000 |
| branch  8FA | F8FA |
| branch  000 | F000 |
| add    dreg,dreg,breg | A112 |

FIG. 9

Program ROM region

| Address | Output, assembly language |
|---|---|
| 800 | 8191 =load   dreg,dm(p+) |
| 801 | 9921 =store  dm(p),breg |
| ⋮ | ⋮ |
| 9A0 | 1000 =nooperation |
| 9A1 | A112 =add    dreg,dreg,breg |
| 9A2 | 08FA =branch   8FA |
| ⋮ | ⋮ |
| FFF | F000 =branch   000 |

Bug → 9A1

FIG.10

Program ROM region

| Address | Output, assembly language |
|---|---|
| 800 | 8191 =load  dreg,dm(p+) |
| 801 | 9921 =store  dm(p),breg |
| ⋮ | ⋮ |
| 9A0 | 1000 =nooperation |
| 9A1 | FFFF =branch   FFF |
| 9A2 | 08FA =branch   8FA |
| ⋮ | ⋮ |
| FFF | F000 =branch   000 |

After correction → 9A1

RAM region

| Address | Output, assembly language |
|---|---|
| 000 | 8191 =load  dreg,dm(p+) |
| 001 | 9921 =store  dm(p),breg |
| ⋮ | ⋮ |
| 02C | 09A2 =branch   9A2 |

FIG.11

| Assembly language | Machine language |
|---|---|
| load   dreg,dm(p+) | 8191 |
| store  dm(p), breg | 9921 |
| nooperation | 0000 |
| branch   8FA | F8FA |
| branch   FFF | FFFF |
| add   dreg,dreg,breg | A112 |

METHOD AND PROCESSOR FOR CHANGING PROGRAM BY REPLACING INSTRUCTION STORED IN ROM WITH PREDETERMINED VALUE TO BE INTERPRETED AS AN INSTRUCTION

BACKGROUND OF THE INVENTION

1. Field of the Invention

The present invention relates to a method for changing a program stored in a read-only memory (ROM) for a processor operating in accordance with such a program and also relates to a processor which can eliminate bugs generated in a program stored in a ROM by changing such a program.

2. Description of the Related Art

A program is basically produced by a man. Therefore, it is impossible to prevent bugs from being generated in a program. Since it is impossible to precisely specify the range of the data dealt by a program for processing an image signal or an audio signal, in particular, it is extremly difficult to totally eliminate the possibility of generating bugs even if test debugging is performed with respect to a great deal of data.

Furthermore, since a competition for developing a product of quality has recently become keener, a new program is required to be developed in a very short period of time, and therefore, there is much demand for realizing a short turn around time (TAT). From such a point of view, various programming methods for preventing bugs from being generated or various methods for shortening the TAT even when bugs have been generated have been proposed.

However, under current circumstances, it is extremely difficult to perform one hundred-percent reliable debugging within such a short period of time assigned for development. Therefore, it is also important to develop a method for providing a product, which has been debugged within a short period of time, as a usable product even if bugs have been generated in the product.

A conventional method for eliminating bugs when the bugs are found in a pram stored in a ROM is described, for example, in Japanese Laid-Open Patent Publication No. 62-239234.

In the case where some program bug is found in a program ROM, an address corresponding to the bug is stored in a circuit. If the address of a program to be executed next time accords with the stored address, an interrupt signal is generated to begin interrupt processing. After the debugging process in an interruption routine is completed, a branch to the next address is executed so as to avoid the stored address. The program bugs are eliminated in this manner.

In a processor, an interruption function is a function which is executed for the purpose of making the processor execute some processing having a higher priority order and greater urgency than those of the processing now being executed.

Therefore, there are many processors which regard an interruption enabled state as a special state. For example, there exist a processor in which, once an interruption is enabled, the data or the like which has been processed before the interruption occurs is automatically retained; a processor which disables another interruption during executing interruption processing; a processor having an instruction which can be used only in the interruption state; and the like.

However, now considering again the original intention to eliminate bugs, it would be understood that it is redundant and meaningless to utilize an interruption function for eliminating bugs. That is to say, the processing actually performed is the processing for eliminating bugs, not the processing corresponding to an interruption. In other words, it is not the utilization of a special interruption function but the elimination of bugs that is the object of the processing. Furthermore, in general, when interruption processing is finished, the routine returns to an instruction which has not been executed because of the interruption, that is to say, an instruction which includes the bugs to be eliminated and is intended to be avoided. Therefore, in the case where it is intended to avoid the instruction having the bugs and return to the next instruction, a processor which does not exit from the interruption in a normal manner but can return to the desired instruction in a special manner must be used. There are many processors which cannot return in such a special manner. In addition, there exist a large number of processors which do not even have an interruption function, let alone a special function. In order to install an interruption function in such a processor, a large-scale circuit must be additionally and newly provided for the processor. Furthermore, a circuit for retaining the address to be avoided and the like are also additionally provided for realizing a special return function. Therefore, considering these inconveniences, such a processor turns out to be very inefficient.

As described above, since a conventional method for eliminating bugs utilizes interruption processing, the number of processors to which such a method is applicable is significantly limited. Moreover, such a method adversely requires the provision of additional circuits.

SUMMARY OF THE INVENTION

According to one aspect of the present invention, a method for changing a program including a plurality of instructions in a processor having a ROM for storing the program therein is provided. The method includes the steps of: replacing one of the plurality of instructions which are stored in the ROM with data having a predetermined value; and interpreting the data having the predetermined value as an instruction.

In one embodiment, the processor interprets the data having the predetermined value as a branch instruction.

In another embodiment, the processor further includes a RAM for storing program therein and interprets the data having the predetermined value as a branch instruction to the RAM.

In still another embodiment, the processor interprets the data having the predetermined value as a no-operation instruction.

In still another embodiment, the ROM includes a plurality of memory cells and a plurality of word lines, and the step of replacing one of the plurality of instructions which are stored in the ROM with the data having the predetermined value includes a step of disconnecting one of the plurality of word lines included in the ROM from all of the plurality of memory cells.

In still another embodiment, the step of disconnecting the word line of the ROM from the memory cells includes a step of cutting the word line of the ROM with a laser cutter.

In still another embodiment, the step of disconnecting the word line of the ROM from the memory cells includes a step of modifying a mask defining a wiring of the ROM.

According to another aspect of the present invention, a processor is provided. The processor includes: a ROM for storing therein a program including a plurality of instructions; means for replacing one of the plurality of instructions which are stored in the ROM with data having a predetermined value; and a decoder for interpreting the data having the predetermined value as an instruction.

In one embodiment, the decoder interprets the data having the predetermined value as a branch instruction.

In another embodiment, the processor further includes a RAM for storing programs therein and the decoder interprets the data having the predetermined value as a branch instruction to the RAM.

In still another embodiment, the decoder interprets the data having the predetermined value as a no-operation instruction.

In still another embodiment, the data is composed of a plurality of bits and each of the plurality of bits has a value "0".

In still another embodiment, the data is composed of a plurality of bits and each of the plurality of bits has a value "1".

In still another embodiment, the ROM includes a plurality of memory cells and a plurality of word lines, and replacing one of the plurality of instructions which are stored in the ROM with the data having the predetermined value is accomplished by disconnecting one of the plurality of word lines included in the ROM from all of the plurality of memory cells.

In still another embodiment, disconnecting the word line of the ROM from the memory cells is accomplished by cutting the word line of the ROM with a laser cutter.

In still another embodiment, disconnecting the word line of the ROM from the memory cells is accomplished by modifying a mask defining a wiring of the ROM.

Hereinafter, the functions obtained by the present invention will be described.

By utilizing the above-described configuration, according to the present invention, even in the case where a program for defining the operation of a processor is stored in a non-rewritable memory such as a ROM, it is possible to change an instruction stored in the ROM. Furthermore, by replacing an instruction having bugs among various instructions to be stored in a ROM by a particular instruction (such as a branch instruction or a no-operation instruction), it is possible to eliminate the bugs from the program stored in the ROM. Such an elimination of bugs is realized very easily by utilizing the functions (such as a branch instruction) originally provided for a commonly used processor without utilizing a complicated and special function such as an interruption.

Thus, the invention described herein makes possible the advantage of providing a method for eliminating bugs from a program stored in a ROM by utilizing the functions originally provided for in a commonly used processor without utilizing a complicated and special function such as an interruption.

This and other advantages of the present invention will become apparent to those skilled in the art upon reading and understanding the following detailed description with reference to the accompanying figures.

BRIEF DESCRIPTION OF THE DRAWINGS

FIG. 2 is a diagram illustrating a relationship between an assembly language and an instruction (or a machine language) executed by the processor 100.

FIG. 3 is a diagram illustrating a relationship between an address in a program ROM 111 before the correction and data (or a program).

FIG. 4 is a diagram illustrating a relationship between an address in a program ROM 111 or in a RAM 112 after the correction and data (or a program) and the execution order of the programs.

FIG. 6 to a diagram illustrating a layout for the program ROM 111 of the processor 100.

FIG. 7 is a diagram illustrating a relationship between an assembly language and an instruction (or a machine language) executed by a process or 102.

FIG. 8 is a diagram illustrating a relationship between an assembly language and an instruction (or a machine language) executed by a processor 103.

FIG. 9 is a diagram illustrating a relationship between an address in the program ROM 111 before the correction and data (or a program).

FIG. 10 is a diagram illustrating a relationship between an address in the program ROM 111 or in the RAM 112 after the correction and data (or a program) and the execution order of the programs.

FIG. 11 is a diagram illustrating a relationship between an assembly language and an instruction (or a machine language) executed by a processor 104.

DESCRIPTION OF THE PREFERRED EMBODIMENTS

Hereinafter, the present invention will be described by way of illustrative examples with reference to the accompanying drawings.

EXAMPLE 1

Figure 1:
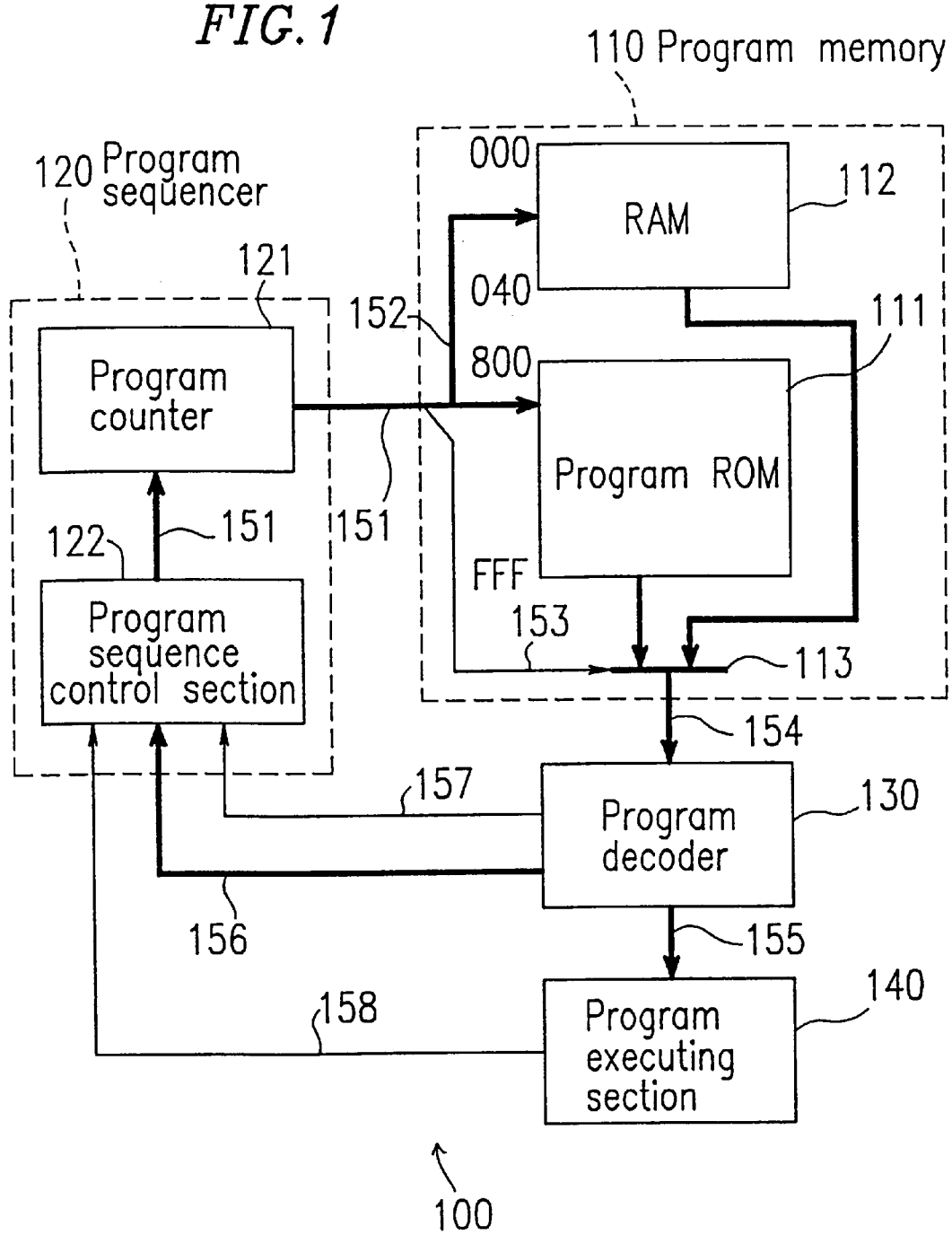
FIG. 1 is a diagram illustrating a configuration for a processor 100 according to the present invention.

FIG. 1 shows a configuration for a processor 100 according to the present invention.

The processor 100 includes: a program memory 110; a program sequencer 120; a program decoder 130; and a program executing section 140.

The program memory 110 includes a ROM 111 and a RAM 112. The ROM 111 is a read-only memory and stores a plurality of micro programs therein. The RAM 112 is a readable/writable memory and stores a plurality of micro programs therein. Addresses from "000" to "040" are assigned to the RAM 112. Addresses other than the addresses assigned to the RAM 112 are assigned to the ROM 111. For example, in the embodiment shown in FIG. 1, addresses from "800" to "FFF" are assigned to the ROM 111. The region for the RAM 112 can be regarded as the region where the data memory is not used.

The program sequencer 120 includes a program counter 121 and a program sequence control section 122. The program sequence control section 122 determines the address 151 of an instruction to be executed next time and supplies the address 151 to the program counter 121. The program counter 121 stores the address 151 (composed of 12 bits, for example) therein. The address 151 composed of 12 bits and stored in the program counter 121 is output to the program memory 110. The lower 11 bits of the address 151 output from the program counter 121 are input to the ROM 111 and the RAM 112 as an address 152. The most significant bit (MSB) 153 of the address 151 output from the program counter 121 is input to a selector 113.

In the case where the most significant bit (MSB) 153 has a value "1", one micro program 154 of the plurality of micro programs stored in the ROM 111 is specified by the address 152 and then output to the program decoder 130. On the other hand, in the case where the most significant bit (MSB) 153 has a value "0", one micro program 154 of the plurality of micro programs stored in the RAM 112 is specified by the address 152 and then output to the program decoder 130. In this way, either the output of the ROM 111 or the output of the RAM 112 is selectively output to the program decoder 130 in accordance with the value of the most significant bit (MSB) 153.

The micro program 154 output to the program decoder 130 becomes a micro program to be executed. A micro program is a unit for executing a program. In this specification, a micro program is also called an "instruction".

The program decoder 130 decodes the micro program 154 output from the program memory 110, thereby outputting a control signal 155 indicating the decoding result to the program executing section 140. In addition, in the case where the program decoder 130 has decoded an instruction to change a program sequence (e.g., a branch instruction), the program decoder 130 informs the program sequence control section 122 in the program sequencer 120 of a branch target address 156 and a branch type 157 (such as an absolute branch, a conditional branch, a sub-routine call and the like).

The program executing section 140 supplies a signal 158 informing of whether or not the condition required by the conditional branch is satisfied to the program sequence control section 122 in the program sequencer 120.

FIG. 2 shows the relationship between en assembly language and an instruction (or a machine language) executed by the processor 100. In the shown example, a machine language is composed of 16 bits and is expressed by a hexadecimal number.

In FIG. 2, it is a branch instruction that is to be remarked. In the case where all of the upper 4 bits of a machine language have a value "0", the machine language in identified by the processor 100 as a branch instruction. The branch target address of a branch instruction is expressed by the lower 12 bits of the machine language. Therefore, the branch instruction to branch to the address "000" is expressed by a machine language "0000".

FIG. 3 shows examples of plurality of instructions stored in the ROM 111. In FIG. 3, the arrow indicates that a bug exists in the instruction corresponding to an address "9A1".

FIG. 4 showed an exemplary method for changing a program by replacing one instruction having a bug among the plurality of instructions stored in the ROM 111 by data (or a machine language) having a predetermined value. The ROM 111 has been corrected to output data (or a machine language) "0000" with respect to the address "9A1" in accordance with the method to be described later with reference to FIGS. 5 and 6.

The region for the RAM 112 is specified by the addresses "000" to "03F". In the example shown in FIG. 4, bug correction programs are stored in the region of the RAM 112 which is specified by the addresses "000" to "02C".

When the program counter 121 outputs an address 151 specifying "9A1" to the program memory 110, the ROM 111 outputs data (or a machine language) "0000" in response to the address 151. As described above, the processor 100 interprets the machine language "0000" as a branch instruction to the address "000". As a result, the execution of the program branches to the address "000" in the RAM 112. Thereafter, the bug correction programs stored in the region specified by the addresses "000" to "02C" in the RAM 112 are sequentially executed. The execution of the programs returns to the address "9A2" by the branch instruction corresponding to the address "02C".

In this way, a program sequence can be changed by replacing one of the plurality of instructions stored in the ROM 111 by a predetermined branch instruotion, which enables the processor 100 operating in a normal mode to eliminate bugs by utilizing ordinary instructions only.

Figure 5:
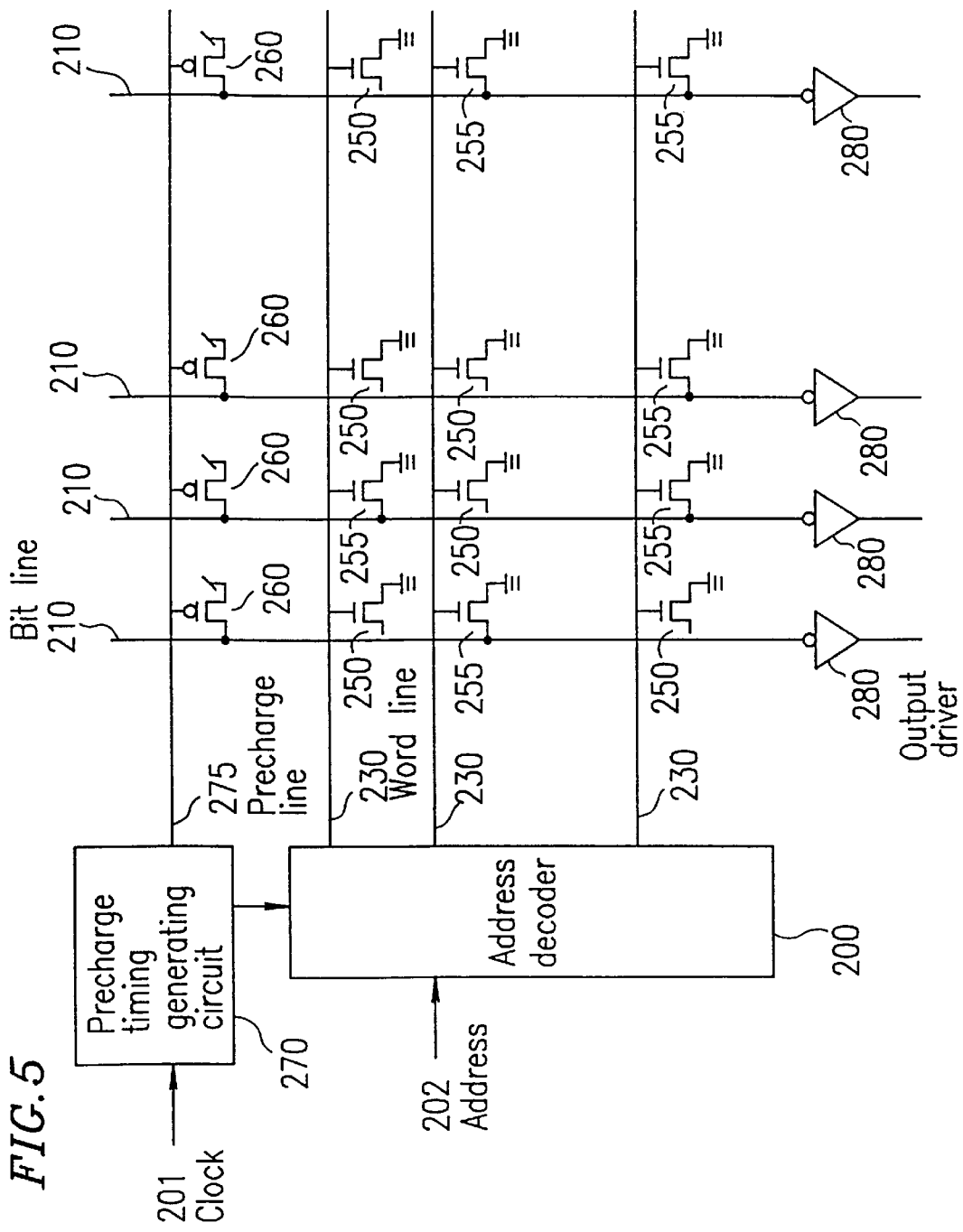
FIG. 5 is a diagram illustrating a configuration for the program ROM 111 of the processor 100.

FIG. 5 shows a configuration for the ROM 111 in the processor 100. A ROM which enables changing of a program sequence Such as the ROM described above is used as the ROM 111.

In FIG. 5, the reference numeral 250 denotes an N-channel transistor (or a memory cell) for retaining data "0" therein. The drain of the transistor 250 is not connected to a bit line 210. The reference numeral 255 denotes an N-channel transistor (or a memory cell) for retaining data "1" therein. The drain of the transistor 255 is connected to the bit line 210.

A precharge timing generating circuit 270 outputs a precharge signal to a precharge line 275 in synchronization with a clock 201. When the precharge signal is output to a precharge line 275, a precharge transistor 260 precharges the bit line 210 to a high level. In synchronization with the clock 201, an address 202 ia input to an address decoder 200. The address decoder 200 decodes the address 202 during a precharge period and, after the precharge period terminates, the decoder 200 sets the level of one of the plurality of word lines 230 which corresponds to the address 202 to be high.

In the case where the transistor 265 is connected to the word line 230, the level of which has been set to be high, the gate of the transistor 255 connected to the word line 230 opens so that the charges which have been charged in the bit line 210 are discharged. As a result, the potential level of the bit line 210 turns from high into low so that data "1" is output from an output driver 280. In the case where the transistor 250 is connected to the word line 230, the level of which has been set to be high, the gate of the transistor 250 connected to the word line 230 opens. However, since the transistor 250 is not connected to the bit line 210, the charges which have been charged in the bit line 210 are not discharged. As a result, the potential level of the bit line 210 is maintained to be high so that data "0" is output from the output driver 280.

Next, the method for changing a program stored in the ROM 111 using the processor 100 according to the present invention will be described.

Assuming that the micro programs shown in FIG. 3 are written in the program ROM 111 and that a bug is found to exist in a micro program corresponding to an address "9A1". In such a case, as shown in FIG. 6, the word line 230 of the ROM 111 corresponding to the address "9A1" is disconnected from a memory cell (250 or 255). For example, the word line 230 is out off with a laser cutter or the like. When the word line 230 corresponding to the address "9A1" is cut off, the word like 230 corresponding to the address "9A1" does not rise even if the address 202 specifies "9A1". As a result, the bit line 210 is maintained in state where the line is precharged to a high level, so that data "0" is output from the output driver 280. As a result, in response to the address 202 specifying "9A1", data "0000" is output from the ROM 111.

On the other hand, in the case where the word line 230 is not out off, if the word line 230 is selected by the address decoder 200, the gate 240 connected to the selected word line 230 opens. In the transistor 255, the charges which have been held in the bit line 210 are discharged into a VSS 220. As a result, the potential level of the bit line 210 becomes low and the potential of the bit line 210 is inverted by the output driver 280 so that the output of the ROM 111 becomes "1". On the other hand, in the transistor 250, the charges which have been held In the bit line 210 are not discharged Into the VSS 220. As a result, the potential level of the bit line 210 is maintained high and the potential of the bit line 210 is ihverted by the output driver 280 so that the output of the ROM 111 becomes "0".

In this way, by cutting off the word line 230 corresponding to the address "9A1", the micro program corresponding to the address "9A1" is replaced by the data "0000". The data "0000" is interpreted by the processor 100 as an absolute branch instruction to the address "000". Therefore, by assigning the address "000" to the RAM 112 beforehand and storing the bug correction programs beginning with the address "000" in the RAM 112 beforehand, the bug can be corrected (see FIG. 4).

In the above-described example, the bug correction programs are assumed to be stored in the RAM 112. However, the present invention is not limited thereto. Alternatively, any arbitrary memory can be used instead of the RAM 112 so long as the memory can perform a rewriting operation at least once. For example, an EEPROM can be used as such a memory.

In the above-described example, the branch target address of the branch instruction is assumed to be "000". However, any arbitrary address can also be used as the branch target address instead of "000". In addition, either a direct addressing or an indirect addressing can be used as an addressing method. For example, in a processor having an instruction system where a micro program corresponding to a machine language "0000" does not exist, the program decoder 130 may be configured to interpret the machine language "0000" as a forced branch instruction to a predetermined address in the RAM 112. As a result, it is possible to branch to an arbitrary address, in the RAM 112.

EXAMPLE 2

FIG. 7 shows the relationship between an assembly language and an instruction (or a machine language) executed by a processor 102. In the illustrated example, a machine language is composed of 16 bits and is expressed by a hexadecimal number.

In FIG. 7, it is a branch instruction that is to be remarked. In the case where all of the upper 4 bits of a machine language have a value "0", the machine language is identified by the processor 102 as a branch instruction. The branch target address of a branch instruction is expressed by an inverse value of the lower 12 bits of the machine language. Therefore, the branch Instruction to branch to the address "000" is expressed by a machine language "FFFF".

The configuration of the processor 102 is the same as that of the processor 100 except that the inverter of the output driver 280 of the ROM 111 shown in FIG. 5 is replaced by a buffer.

EXAMPLE 3

FIG. 8 shows the relationship between an asembly language and an instruction (or a machine language) executed by a processor 103. In the shown example, a machine language is composed of 16 bits and is expressed by a hexadecimal number.

In FIG. 8, it is a branch instruction that is to be remarked. In the case where all of the upper 4 bits of a machine language have a value "1", the machine language is identified by the processor 103 as a branch instruction. The branch target address of a branch instruction is expressed by the lower 12 bits of the machine language. Therefore, a branch instruction to branch to an address "FFF" is expressed by a machine language "FFFF". The address "FFFF" is the last address in the ROM 111.

In the region of the ROM 111 specified by the address "FFF", a branch instruction to branch to the address "000" (or a machine language "F000") has been stored beforehand. As a result, it is possible to indirectly branch to the address "000" by way of a particular branch instruction (or a machine language "FFFF").

The configuration of the processor 103 is the same as that of the processor 100 except that the inverter of the output driver 280 of the ROM 111 shown in FIG. 5 is replaced by a buffer.

Next, the procedure of the method for changing a program stored in the ROM 111 using the processor 103 according to the present invention will be described.

It is assumed that the micro programs shown in FIG. 9 are written in the program ROM 111 and that a bug is found to exist in a micro program corresponding to an address "9A1". In such a case, the word line 230 of the ROM 111 corresponding to the address "9A1" is disconnected from a memory cell (250 or 255). For example, the word line 230 is cut off with a laser cutter or the like. When the word line 230 corresponding to the address "9A1" is cut off, the word line 230 corresponding to the address "9A1" does not rise even if the address 202 specifies "9A1". As a result, the bit line 210 is maintained in a state where the line is precharged to a high level, so that data "1" is output from the output driver 280. As a result, in response to the address 202 specifying "9A1", data "FFFF" is output from the ROM 111.

In this way, by cutting off the word line 230 corresponding to the address "9A1", the micro program corresponding to the address "9A1" is replaced by the data "FFFF". The data "FFFF" is interpreted by the processor 103 as an absolute branch instruction to the address "FFF". In addition, a branch instruction to branch to the address "000" (or a machine language "F000") is stored beforehand in the region specified by the address "FFF". Therefore, by assigning the address "000" to the RAM 112 and storing bug correction programs beginning with the address "000" in the RAM 112 beforehand, the bug can be corrected (see FIG. 10).

EXAMPLE 4

FIG. 11 shows the relationship between an assembly language and an instruction (or a machine language) executed by a processor 104. In the present example, a machine language is composed of 16 bits end is expressed by a hexadecimal number.

In FIG. 11, it is a no-operation instruction that is to be remarked. In the case where all of the bits of a machine language have a value "0", the machine language is identified by the processor 104 as a no-operation instruction.

The configuration of the processor 104 is the same as that of the processor 100.

Next, the procedure of the m method for changing a program stored in the ROM 111 using the processor 104 according to the present invention will be described.

It is assumed that a bug is found to exist in a micro program in the ROM 111 specified by an address, "9A1". In such a case, the word line 230 of the ROM 111 corresponding to the address "9A1" is disconnected from a memory cell (250 or 255). For example, the word line 230 is out off with a laser cutter or the like. When the word line 230 corresponding to the address "9A1" is cut off, the word line 230 corresponding to the address "9A1" does not rise even if the address 202 specifies "9A1". As a result, the bit line 210 is maintained in state there the line is precharged to a high level so that data "0" is output from the output driver 280. As a result, in response to the address 202 specifying "9A1", data "0000" is output from the ROM 111.

In this way, by cutting off the word line 230 corresponding to the address "9A1", the micro program corresponding to the address "9A1" is replaced by the data "0000". The data "0000" is interpreted by the processor 104 as a no-operation instruction. Therefore, it is possible to skip to a micro program next to the micro program having a bug without executing the micro program having a bug. In the case where new processing is not particularly required for eliminating bugs, the bugs can be eliminated by utilizing a no-operation instruction as described above.

EXAMPLE 5

Figure 12:
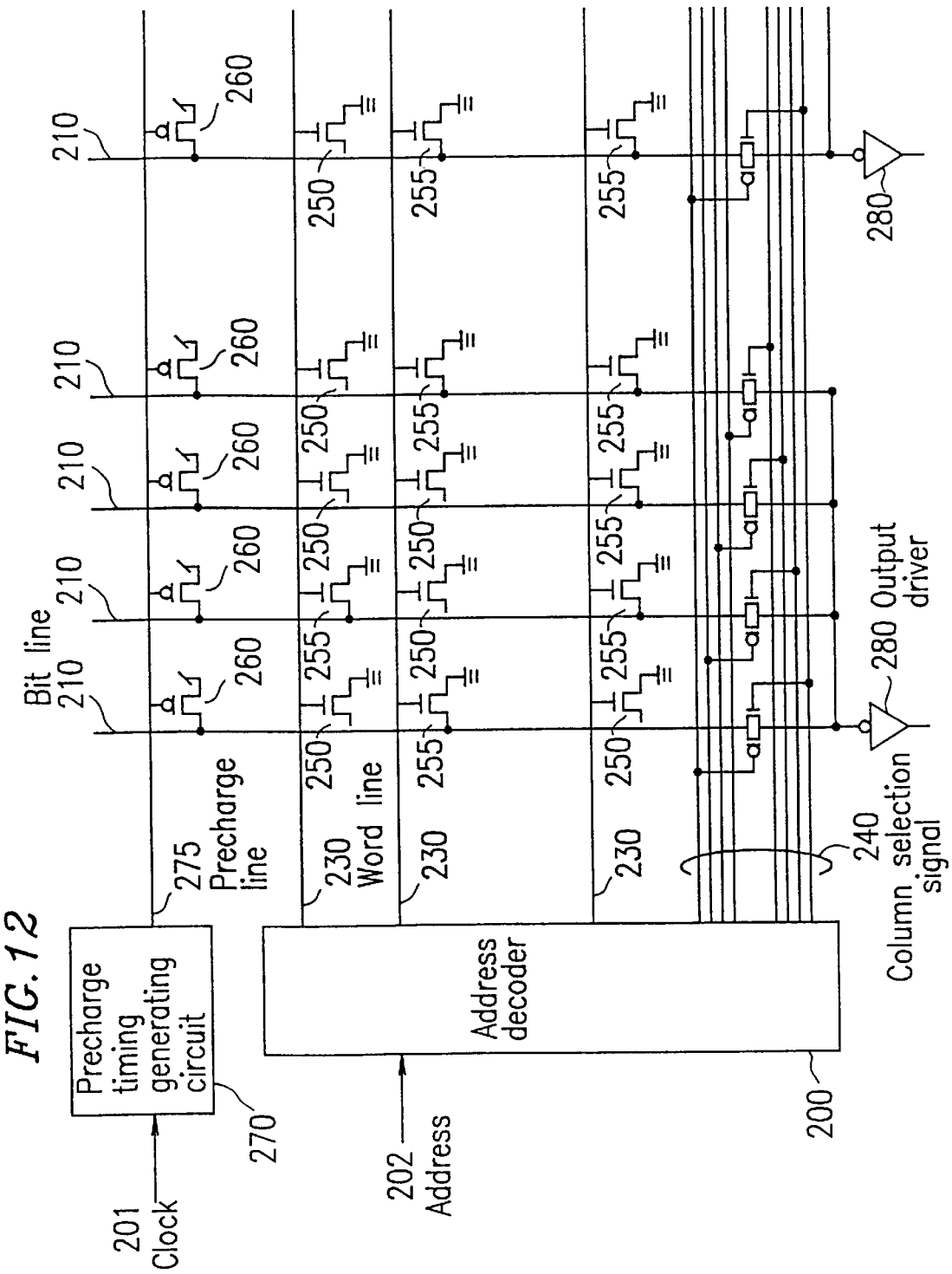
FIG. 12 Is a diagram illustrating another configuration for the program ROM 111 of the processor 100.

FIG. 12 shows another configuration for the ROM 111. The ROM 111 shown in FIG. 12 has a configuration in which a column selection system is included. In the example shown in FIG. 12, one of four columns is selected in response to a column selection signal 240, so that data corresponding to the selected column is output.

Next, the procedure of the method for changing a program stored in the ROM 111 using the processor 100 according to the present invention will be described.

It is assumed that a bug is found to exist in a micro program in the ROM 111 specified by an address "9A1". In such a case, the word line 230 of the ROM 111 corresponding to the address "9A1" is disconnected from a memory cell (250 or 255). For example, the word line 230 is cut off with a laser cutter or the like. When the word line 230 corresponding to the address "9A1" is cut off, the word line 230 does not rise even if the address 202 specifies an address belonging to the word line 230 (e.g., "9A0" to "9A3"). As a result, the bit line 210 is maintained In state where the line is precharged to a high level so that data "0" is output from the output driver 280. As a result, in response to the address 202 specifying "9A0" to "9A3", data "0000" is output from the ROM 111.

In this way, by cutting off the word line 230 corresponding to the address "9A1", all of the four micro programs corresponding to the addresses "9A0" to "9A3" are replaced by the data "0000". This means that not only one program having a bug but also three programs having no bug are also replaced by the data "0000". The three micro programs having no bug Are saved by the method to be described below with reference to FIG. 13.

Figure 13:
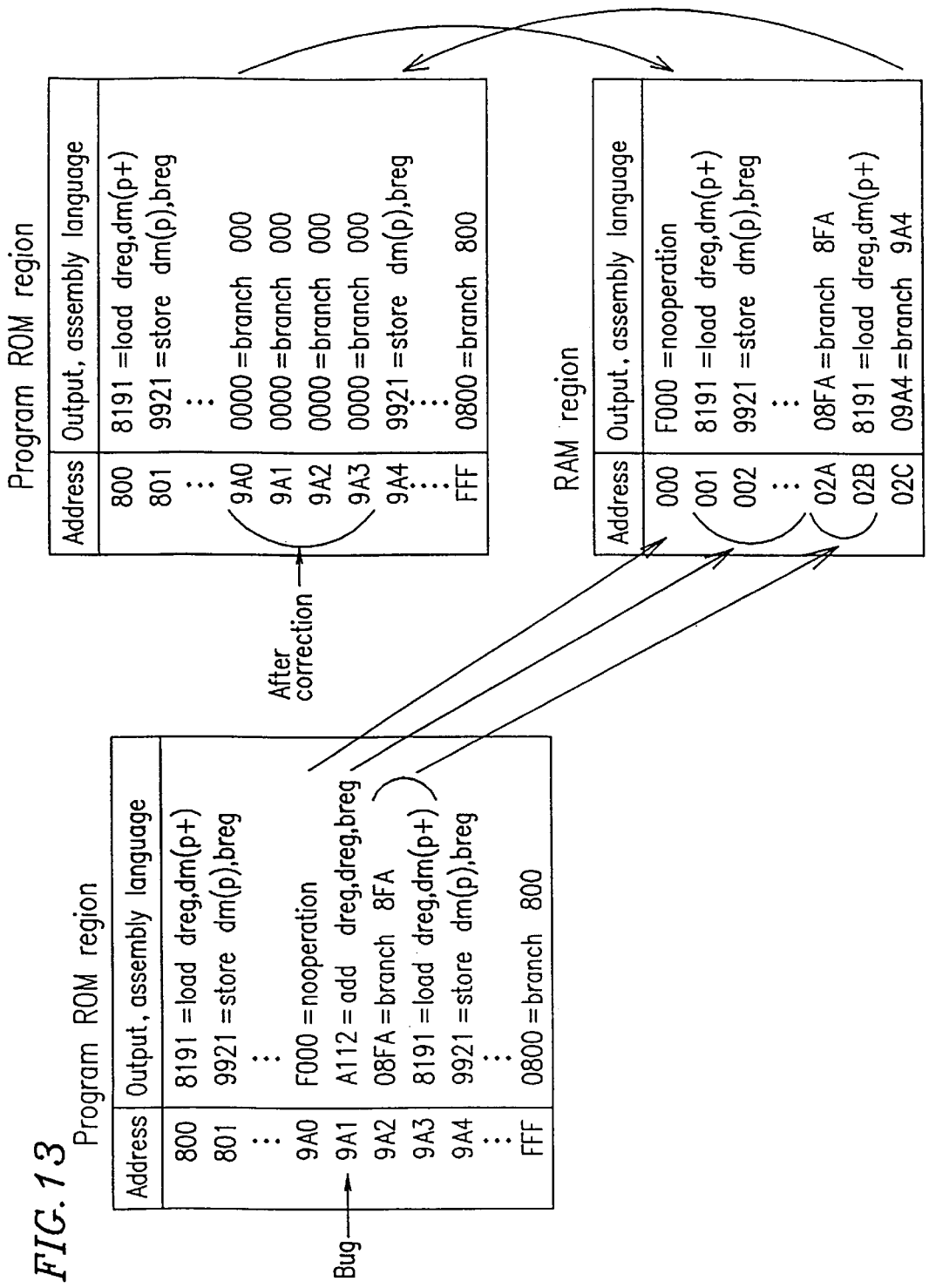
FIG. 13 is a diagram illustrating a relationship between an address in the program ROM 111 before the correction and date (or a program), a relationship between an address in the program ROM 111 or In the RAM 112 after the correction and data (or a program) and the execution order of the programs.

FIG. 13 illustrates an exemplary method for changing a program by replacing four instructions stored in the ROM 111 by data having a predetermined value (or a machine language).

At an address "000" in the RAM 112, the same micro program ("F000" in the example shown in FIG. 13) as the micro program which has been stored at the address "9A0" in the ROM 111 is stored. Bug correction programs are stored In the region of the RAM 112 specified by the addresses "001" to "029". At an address "02A" in the RAM 112, the same micro program ("08FA" In the example shown in FIG. 13) as the micro program which has been stored at the address "9A2" in the ROM 111 is stored. At an address "02B" in the RAM 112, the same micro program ("8191" in the example shown in FIG. 13) as the micro program which has been stored at the address "9A3" in the ROM 111 is stored. At an address "02C" in the RAM 112, a branch instruction to branch to the address "9A4" in the ROM 111 is stored.

When the program counter 121 outputs an address 151 specifying the address "9A0" to the program memory 110, the ROM 111 outputs data (or a machine language) "0000" in response to the address 151. The processor 105 interprets the machine language "0000" as a branch instruction to the address "000". Consequently, the execution of the programs results in branching to the address "000" in the RAM 112. Thereafter, the micro programs stored in the region specified by the addresses "000" to "02C" in the RAM 112 are sequentially executed. The execution of the programs returns to the address "9A4" by the branch instruction corresponding to the address "02C".

In this way, by executing the three micro programs having no bug, bug correction programs can be performed Instead of the micro program having a bug.

In the above-described embodiments, when the word line 230 is cut off, the data output from the ROM 111 is "0000" or "FFFF". However, the data output from the ROM 111 when the word line 230 is cut off is not limited to "0000" or "FFFF".

For example, in the case where addressee "000" to "7FF" are assigned to the ROM 111 and addresses "800" to "840" are assigned to the RAM 112, an absolute branch instruction is assumed to be expressed by "1xxx". In such a case, the data output from the ROM 111 in the case where the word line 230 Is cut off may be "1800". Such an output data can be obtained easily by changing the inverters of the output drivers 280 corresponding to the 12th and the 13th bits counted from the least significant bit into buffers among the 16 output drivers 280 of the ROM 111 shown in FIG. 5. However, it is noted that the data corresponding to the 12th and the 13th bits counted from the least significant bit to be written into the ROM 111 are required to be inverted and the data inverted in this way are required to be stored in the ROM 111.

In the above-described embodiments, a method in which the word line 230 of the ROM 111 is out off with a laser cutter has been described as the method for disconnecting the word line 230 of the ROM 111 from the memory cell (250 or 255). This is an effective method for eliminating the bugs generated during modelling a processor. In order to use the processor of the invention as a final product, it is preferable to disconnect the word line 230 of the ROM 111 from the memory cell (250 or 255) by modifying a mask defining the wiring of the ROM 111. It is sufficient to modify one or several masks and so such a modification can be performed easily.

Moreover, in the method for changing a program according to the present invention, it is necessary to write bug correction programs into the RAM 112 before-hand. Writing such bug correction programs into the RAM 112 is realized easily by adding a routine of writing bug correction programs into the RAM 112 to a routine of initializing a processor In a system using the processor.

Therefore, the present invention is effectively applicable not only for eliminating bugs generated during modelling of a processor but also to a processor to be used as a final product.

As is apparent from the foregoing examples, by replacing an instruction having a bug among a plurality of instructions stored in a ROM by data having a predetermined value, it is possible to eliminate the bug in the program stored in the ROM by utilizing the functions originally provided for in a commonly used processor without utilizing a complicated and special function such as an interruption.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for changing a program including a plurality of instructions in a processor having a read only memory (ROM) for storing the program therein, comprising the steps of:

replacing one of the plurality of instructions which are stored in the ROM with data having a predetermined value, the data having the predetermined value itself being stored in the ROM; and interpreting the data having the predetermined value as a branch instruction by accessing the data having the predetermined value from the ROM.

2. A method according to claim 1, wherein the processor further comprises a RAM for storing programs therein and interprets the data having the predetermined value as a branch instruction to the RAM.

3. A method according to claim 1, wherein the data is composed of a plurality of bits and each of the plurality of bits has a value "0".

4. A method according to claim 1, wherein the data is composed of a plurality of bits and each of the plurality of bits has a value "1".

5. A method according to claim 1, wherein the ROM comprises a plurality of memory cells and a plurality of word lines, and wherein the step of replacing one of the plurality of instructions which are stored in the ROM with the data having the predetermined value comprises a step of disconnecting one of the plurality of word lines comprised in the ROM from all of the plurality of memory cells.

6. A method according to claim 5, wherein the step of disconnecting the word line of the ROM from the memory cells comprises a step of cutting the word line of the ROM with a laser cutter.

7. A method according to claim 5, wherein the step of disconnecting the word line of the ROM from the memory cells comprises a step of modifying a mask defining a wiring of the ROM.

8. A processor comprising:

a read only memory (ROM) for storing therein a program including a plurality of instructions;

means for replacing one of the plurality of instructions which are stored in the ROM by data having a predetermined value, the data having the predetermined value itself being stored in the ROM; and a decoder for interpreting the data having the predetermined value as a branch instruction by accessing the data having the predetermined value from the ROM.

9. A processor according to claim 8, wherein the processor further comprises a RAM for storing programs therein and the decoder interprets the data having the predetermined value as a branch instruction to the RAM.

10. A processor according to claim 8, wherein the data is composed of a plurality of bits and each of the plurality of bits has a value "0".

11. A processor according to claim 8, wherein the data is composed of a plurality of bits and each of the plurality of bits has a value "1".

12. A processor according to claim 8, wherein the ROM comprises a plurality of memory cells and a plurality of word lines, and wherein replacing one of the plurality of instructions which are stored in the ROM with the data having the predetermined value is accomplished by disconnecting one of the plurality of word lines comprised in the ROM from all of the plurality of memory cells.

13. A processor according to claim 12, wherein disconnecting the word line of the ROM from the memory cells is accomplished by cutting the word line of the ROM with a laser cutter.

14. A processor according to claim 12, wherein disconnecting the word line of the ROM from the memory cells is accomplished by modifying a mask defining a wiring of the ROM.

15. In a processor including a program executing section, a read only memory (ROM) for storing a program including a plurality of instructions to be executed by the program executing section, and a memory for storing at least one supplemental instruction, a method for changing the program stored in the ROM comprising the steps of:

replacing one of the plurality of instructions stored in the ROM by storing data having a predetermined value in the ROM in place of the one of the plurality of instructions;

enabling the program executing section to access the data having the predetermined value from the ROM and interpret the accessed data as a branch instruction to the memory; and enabling the program executing section to access the at least one supplemental instruction from the memory and execute the at least one supplemental instruction in lieu of the replaced one of the plurality of instructions.

* * * * *